United States Patent
Niikura

(10) Patent No.: US 8,279,303 B2
(45) Date of Patent: Oct. 2, 2012

(54) IMAGING APPARATUS AND FLICKER DETECTION METHOD

(75) Inventor: Kentarou Niikura, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 442 days.

(21) Appl. No.: 12/448,251

(22) PCT Filed: Sep. 27, 2007

(86) PCT No.: PCT/JP2007/069425
§ 371 (c)(1),
(2), (4) Date: Jun. 15, 2009

(87) PCT Pub. No.: WO2008/108025
PCT Pub. Date: Sep. 12, 2008

(65) Prior Publication Data
US 2010/0013953 A1    Jan. 21, 2010

(30) Foreign Application Priority Data
Mar. 5, 2007    (JP) .................................. 2007-54056

(51) Int. Cl.
*H04N 9/73* (2006.01)
(52) U.S. Cl. .................................................. 348/226.1
(58) Field of Classification Search ................ 348/226.1
See application file for complete search history.

(56) References Cited

U.S. PATENT DOCUMENTS

| | | | |
|---|---|---|---|
| 6,710,818 B1 | 3/2004 | Kasahara et al. | |
| 7,289,144 B2 * | 10/2007 | Arazaki | 348/228.1 |
| 7,667,740 B2 * | 2/2010 | Hofer | 348/226.1 |
| 2002/0044205 A1 | 4/2002 | Nagaoka et al. | |
| 2002/0158971 A1 * | 10/2002 | Daiku et al. | 348/226.1 |
| 2003/0112343 A1 | 6/2003 | Katoh et al. | |
| 2004/0001153 A1 | 1/2004 | Kikukawa et al. | |
| 2004/0012692 A1 | 1/2004 | Arazaki | |
| 2004/0201729 A1 * | 10/2004 | Poplin et al. | 348/226.1 |

(Continued)

FOREIGN PATENT DOCUMENTS

EP    1 091 571 A2    4/2001

(Continued)

OTHER PUBLICATIONS

Korean Office Action dated Nov. 29, 2010, with Japanese and partial English translation.

(Continued)

*Primary Examiner* — Sinh Tran
*Assistant Examiner* — Jason Flohre
(74) *Attorney, Agent, or Firm* — McGinn IP Law Group, PLLC

(57) ABSTRACT

An exposure control unit 15 controls a charge accumulation time for a CMOS sensor 10. The CMOS sensor 10 captures an image P1 with a charge accumulation time T1 and an image P2 with a charge accumulation time T2. The charge accumulation time T1 does not cause a flicker in an image under a light source blinking at a first blink cycle. The charge accumulation time T2 is different from the charge accumulation time T1. A difference image generation unit 17 generates a difference image DP that emphasizes to show a difference in luminance of the images P1 and P2. A flicker detection unit 18 detects a flicker occurrence in the image P2 based on a difference in luminance between P1 and P2 appearing in the difference image DP.

17 Claims, 9 Drawing Sheets

U.S. PATENT DOCUMENTS

| | | |
|---|---|---|
| 2006/0290797 A1 | 12/2006 | Tanaka et al. |
| 2007/0052817 A1* | 3/2007 | Kaplinsky et al. ......... 348/226.1 |
| 2007/0153094 A1* | 7/2007 | Noyes et al. ............... 348/226.1 |
| 2007/0182831 A1 | 8/2007 | Katoh et al. |

FOREIGN PATENT DOCUMENTS

| | | |
|---|---|---|
| EP | 1 253 780 A2 | 10/2002 |
| JP | 2001-16508 A | 1/2001 |
| JP | 2001-44774 A | 2/2001 |
| JP | 2002-84466 | 3/2002 |
| JP | 2003-189129 A | 7/2003 |
| JP | 2003-189172 | 7/2003 |
| JP | 2004-7402 A | 1/2004 |
| JP | 2006-245784 A | 9/2006 |
| JP | 2008-109253 A | 5/2008 |

OTHER PUBLICATIONS

Notice of Reason(s) for Rejection dated Jul. 5, 2011, with English translation.

* cited by examiner

CAPTURED IMAGE P1 − CAPTURED IMAGE P2 = DIFFERENCE IMAGE DP

CAPTURED IMAGE P1 − CAPTURED IMAGE P2 = DIFFERENCE IMAGE DP

IMAGING APPARATUS AND FLICKER DETECTION METHOD

TECHNICAL FIELD

The present invention relates to an imaging apparatus incorporated to a digital still camera or the like, and particularly to an imaging apparatus having a detection function for a flicker generated in a captured image due to an illuminance fluctuation of light source such as fluorescent light.

BACKGROUND ART

A CMOS (Complementary Metal Oxide Semiconductor) sensor, which is one of solid-state image sensors, performs so-called line exposure. Therefore, there is a deviation in the timing for charge accumulation of each pixel (photodiode) making up the capturing surface of the CMOS sensor by each line (scanning line) according to a scan timing of each pixel. Thus, when capturing an image using a CMOS sensor in an environment where the brightness of a subject periodically changes such as indoor having a non-inverter type fluorescent light, bright and dark horizontal stripes may be generated in a captured image. The phenomenon that horizontal stripes are generated in a captured mage is referred to as a flicker.

As one of the methods to suppress an occurrence of a flicker in a captured image, there is a method to configure charge accumulation time (shutter speed) of a CMOS sensor to an integral multiple of a blink cycle of a light source (for example see patent citation 1). In an imaging apparatus with adjusted charge accumulation time, light intensity fluctuation of a light source within the charge accumulation time for each pixel is uniformized even if the timing for charge accumulation differs depending on each pixel. Thus the occurrence of a flicker can be suppressed.

For example, a blink frequency of the abovementioned non-inverter type fluorescent light is twice more than a power supply frequency of commercial alternating current power supply. That is, the blink cycle of fluorescent light is ¹⁄₁₀₀ second in the region with power supply frequency of 50 Hz and ¹⁄₁₂₀ second in the region with power supply frequency of 60 Hz. Accordingly, in the region with power supply frequency of 50 Hz, the charge accumulation time may be N/100 second and in the region with power supply frequency of 60 Hz, the charge accumulation time may be M/120 second. Here, N and M are positive integers. However in patent citation 1, there are no methods disclosed such as the method to detect a flicker itself and the method to optimize charge accumulation time of a CMOS sensor in response to a detection of a flicker.

In patent citation 2, there is an imaging apparatus disclosed that detects a flicker occurrence using a flicker index value calculated based on an image obtained by a CMOS sensor and switches charge accumulation time according to the detected result.

To be more specific, the imaging apparatus disclosed in patent citation 2 is able to switch the charge accumulation time for the CMOS sensor between first charge accumulation time (for example N/100 second) corresponding to a first power supply frequency (for example 50 Hz) and second charge accumulation time (for example M/120 second) corresponding to a second power supply frequency (for example 60 Hz). Furthermore, the imaging apparatus of patent citation 2 calculates a projection value D which is an accumulation of pixel values for a plurality of pixels included in a predetermined line in a captured image by a CMOS sensor and computes a flicker index value I that indicates an amount of change in the projection output value D between a plurality frames. For example the flicker index value I calculated using images for 4 frames is computed from the following formula (1). Note that in the formula (1), D(n) is a projection output value of a predetermined line in nth frame.

$$I = \sum_{n=k}^{k+3} |D(n+1) - D(n)| \quad (1)$$

Switching the charge accumulation time by the imaging apparatus disclosed in patent citation 2 is performed by comparing a flicker index value I1 with a flicker index value I2. The flicker index value I1 is obtained from an image captured with the first charge accumulation time. The flicker index value I2 is obtained from an image captured with the second charge accumulation time. The imaging apparatus disclosed in patent citation 2 selects the charge accumulation time with a smaller flicker index value. Furthermore, for example, if the flicker index value I1 has increased more than a predetermined threshold when configured to the first charge accumulation time, switching from the first charge accumulation time to the second charge accumulation time is performed.

[Patent Citation 1]
Japanese Unexamined Patent Application Publication No. 2003-189172
[Patent Citation 2]
Japanese Unexamined Patent Application Publication No. 2002-84466

DISCLOSURE OF THE INVENTION

Technical Problem

As described above, the imaging apparatus disclosed in patent citation 2 computes an accumulated value (projection value) of pixel values concerning a predetermined line for a plurality of images consecutively captured. Furthermore, the imaging apparatus disclosed in patent citation 2 obtains a flicker index value by measuring differences in the projection output values in 2 images across a predetermined number of frames. Furthermore, the imaging apparatus disclosed in patent citation 2 detects a flicker using the obtained flicker index value. However, in the flicker detection method by the imaging apparatus disclosed in patent citation 2, there is a problem that dependency to a frame rate is large, as described in the following.

The flicker evaluation method disclosed in patent citation 2 detects a flicker in a captured image using that a timing for photoelectric conversion of each pixel in the predetermined line of the captured image is not synchronized with a blink cycle of a light source (for example, see the paragraphs 43 to 46 in patent citation 2). Accordingly, for example, if 1 frame period is synchronized with a blink cycle of a light source, that is, if 1 frame period is an integral multiple of the blink cycle of the light source, an accumulated charge amount of each pixel in the predetermined line of the image does not fluctuate between a plurality of images consecutively captured. That is, in such case, it is difficult to detect a flicker by the method disclosed in patent citation 2. As stated above, the flicker detection method by the imaging apparatus disclosed in patent citation 2 has a problem that dependency to a frame rate is large.

Technical Solution

In one embodiment of the present invention, an imaging apparatus includes an imaging sensor, a control unit and a flicker detection unit. The control unit controls capturing a first image by the imaging sensor adjusted to first charge accumulation time and capturing a second image by the imaging sensor adjusted to second charge accumulation time. The first charge accumulation time does not cause a flicker in a captured image under a light source blinking at a first blink cycle. The second charge accumulation time is different from the first charge accumulation time. The flicker detection unit detects a flicker occurrence in the second image based on a difference in luminance between a first image captured by the imaging sensor adjusted to the first charge accumulation time and the second image captured by the imaging sensor adjusted to the second charge accumulation time.

When performing a capture using the imaging apparatus configured as above under a light source that blinks at the first blink cycle, there is no flicker appeared in the first image obtained in the first charge accumulation time. On the other hand, in the second image obtained in the second charge accumulation time, regardless of whether 1 frame period of the second image is an integral multiple of the first blink cycle of a light source or not, horizontal stripes by a flicker appears if the second charge accumulation time is not synchronized with the first blink cycle. Therefore, by using the difference in luminance of the first and second images, regardless of whether 1 frame period of the first and second images is an integral multiple of the blink cycle of the light source or not, flicker detection is possible. Thus, with the imaging apparatus according to the one embodiment of the present invention, it is possible to reduce dependency of flicker detection accuracy to a frame rate and improve the flicker detection accuracy.

In another embodiment of the present invention, a flicker detection method is provided. More specifically, charge accumulation time for an imaging sensor is switched between first charge accumulation time and second charge accumulation time so as to execute capturing first image by the imaging sensor adjusted to the first charge accumulation time and capturing second image by the imaging sensor adjusted to the second charge accumulation time. The first charge accumulation time is synchronized with a first blink cycle of a light source and not generating a flicker in a captured image under the light source blinking at the first blink cycle. The second charge accumulation time is different from the first charge accumulation time. Furthermore, a flicker occurrence in the second image is detected based on a difference in luminance between the first image and the second image.

With the flicker detection method according to the another embodiment of the present invention, by using the difference in luminance of the first and second images, regardless of whether 1 frame period of the first and second images is an integral multiple of the blink cycle of the light source or not, a flicker detection is possible. Thus, it is possible to reduce dependency of flicker detection accuracy to a frame rate and improve the flicker detection accuracy.

The present invention enables to provide an imaging apparatus with reduced dependency of flicker detection accuracy to a frame rate and improved flicker detection accuracy.

EXPLANATION OF REFERENCE NUMERALS

Figure 1:
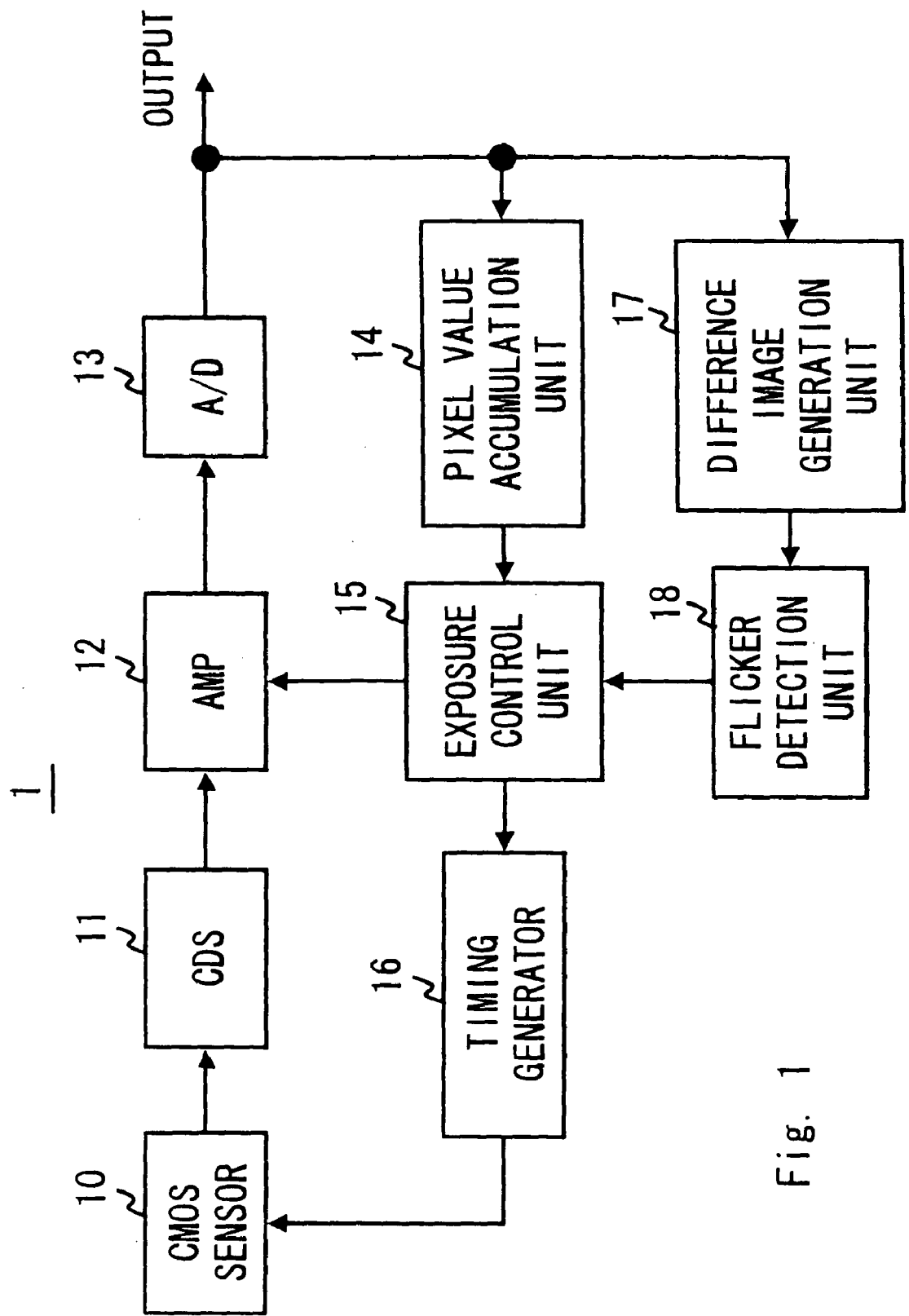
FIG. 1 A block diagram of an imaging apparatus 1 according to a first embodiment of the present invention.

1, 2 IMAGING APPARATUS
10 CMOS SENSOR
11 CDS (Correlated double sampling) CIRCUIT
12 AMPLIFIER
13 A/D CONVERTER
14 PIXEL VALUE ACCUMULATION UNIT EXPOSURE CONTROL UNIT
16 TIMING GENERATOR
17 DIFFERENCE IMAGE GENERATION UNIT
18, 28 FLICKER DETECTION UNIT

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, specific embodiments incorporating the present invention are described in detail with reference to the drawings. In each of the drawings, components identical are denoted by reference numerals identical to those therein with repeating description omitted as appropriate for the clarity of explanation.

First Embodiment

FIG. 1 is a block diagram of an imaging apparatus 1 according to this embodiment. In FIG. 1, a CMOS sensor 10 is a solid-state image sensor that is manufactured by diverting the manufacturing process of CMOS integrated circuits. The CMOS sensor 10 has a capturing surface formed by photodiodes corresponding to each pixel in matrix. Moreover, to each pixel of the CMOS sensor 10, a transistor for selectively reading out a signal charge accumulated in each pixel and a transistor for resetting the signal charge accumulated in each pixel are disposed. In the CMOS sensor 10 formed as above, as contrasted with a CCD image sensor, a charge accumulation timing of each pixel forming the capturing surface differs according to a scan timing of each pixel and a charge accumulation is performed at a different timing for each pixel to generate an image signal.

A CDS (Correlated double sampling) circuit 11 removes noise of the image signal generated by the CMOS sensor 10 by performing a correlated double sampling. An amplifier 12 amplifies the image signal with noise removed by the CDS circuit 11. A gain of the amplifier 12 is controlled by an exposure control unit 15 described later together with charge accumulation time for the CMOS sensor 10 in order for an image by the CMOS sensor to have a desired luminance.

An A/D converter 13 samples the image signal amplified by the amplifier 12 to convert into a digital signal. The digital image signal output from the A/D converter 13 is input to an image processing unit not shown and a color signal interpolation, a color correction and a white balance adjustment or the like are performed by the image processing unit (not shown).

A pixel value accumulation unit 14 inputs an output signal from the A/D converter 13, accumulates pixel values of pixels included in the entire image plane or a part of the image plane by each image frame and supplies the obtained accumulated value to the exposure control unit 15. The pixel value accumulation unit 14 may compute an average value of the pixel values in the image frame using the accumulated value of the pixel values and may supply the obtained average value to the exposure control unit 15.

The exposure control unit 15 determines the charge accumulation time (shutter speed) for the CMOS sensor 10 and the gain for the amplifier 12 based on the accumulated value or average value of the pixel values for the image, which is supplied from the pixel value accumulation unit 14. The exposure control unit 15 outputs a setting signal to a timing generator 16 in order to control the CMOS sensor 10 so that the charge accumulation time for the CMOS sensor 10 is to be the determined value. Moreover, the exposure control unit 15 outputs a setting signal to the amplifier 12 in order to configure the gain for the amplifier 12.

Furthermore, the exposure control unit 15 controls the charge accumulation time for the CMOS sensor 10 so as to obtain images p1 and p2 that are to be bases of a difference image DP that is generated by a difference image generation unit 17 described later in order to execute a flicker detection of this embodiment.

To be more specific, the exposure control unit 15 executes image capturing by alternately switching the charge accumulation time for the CMOS sensor 10 between two charge accumulation times T1 and T2. One of the charge accumulation time T1 is synchronized with a first blink cycle of a light source such as fluorescent light and is first charge accumulation time that does not generate a flicker in a captured image of the CMOS sensor 10 under a light source that blinks at the first blink cycle. Another charge accumulation time T2 is second charge accumulation time different from the first charge accumulation time. There are a plurality of examples for illustrative examples of the second charge accumulation time, which are described later.

For example if the first blink cycle of a light source is $1/100$ second (blink frequency 100 Hz), the first charge accumulation time T1 is to be an integral multiple of the first blink cycle of the light source, which is N/100 second, and the second charge accumulation time T2 is to be a value except integral multiples of the first blink cycle of the light source. Moreover, for example, if the first blink cycle of a light source is $1/120$ (blink frequency 120 Hz), the first charge accumulation time T1 is to be an integral multiple of the first blink cycle of the light source, which is N/120 second, and the second charge accumulation time T2 is to be a value except N/120 second. Here, N is a positive integer. Hereinafter, in the embodiment, the explanation assumes that the first blink cycle of a light source is $1/100$ second.

The timing generator 16 outputs to the CMOS sensor 10 a pulse signal for defining a reset timing of charge accumulated in each pixel and a pulse signal for defining a vertical selection for reading out signal charge accumulated in each pixel so that charge accumulation time for each pixel in the CMOS sensor 10 is to be the value indicated by the exposure control unit 15.

The difference image generation unit 17 inputs a image signal regarding the images P1 and P2 for 2 frames captured in the 2 different charge accumulation time T1 and T2 according to the control by the exposure control unit 15. The difference image generation unit 17 generates a difference image DP between these 2 frames of images P1 and P2. Here, the difference image DP is a image obtained by calculating differences in pixel values of pixels corresponding in horizontal and vertical positions of the capturing surface between the 2 frames of images.

An illustrative example of the process by the difference image generation unit 17 is described with reference to FIG. 2. The example of FIG. 2 divides 1 frame image 21 into 24 in vertical direction and into 8 in horizontal direction to divide into total of 192 blocks and accumulates pixel values for each block. Moreover, average values of pixel values for total of 24 blocks (a reference numeral 22 in FIG. 2) that are obtained by aggregating the accumulated values of each block in the horizontal direction. After calculating the average values shown in FIG. 2 for each of the 2 frames images P1 and P2, the difference image generation unit 17 generates the difference image DP for flicker detection by calculating differences of the average values for each block between the 2 frames. That is, by performing a calculation in the example of FIG. 2, the difference image DP in which the horizontal direction is aggregated in 1 block and vertical direction is aggregated in 24 blocks is generated.

Figure 2:
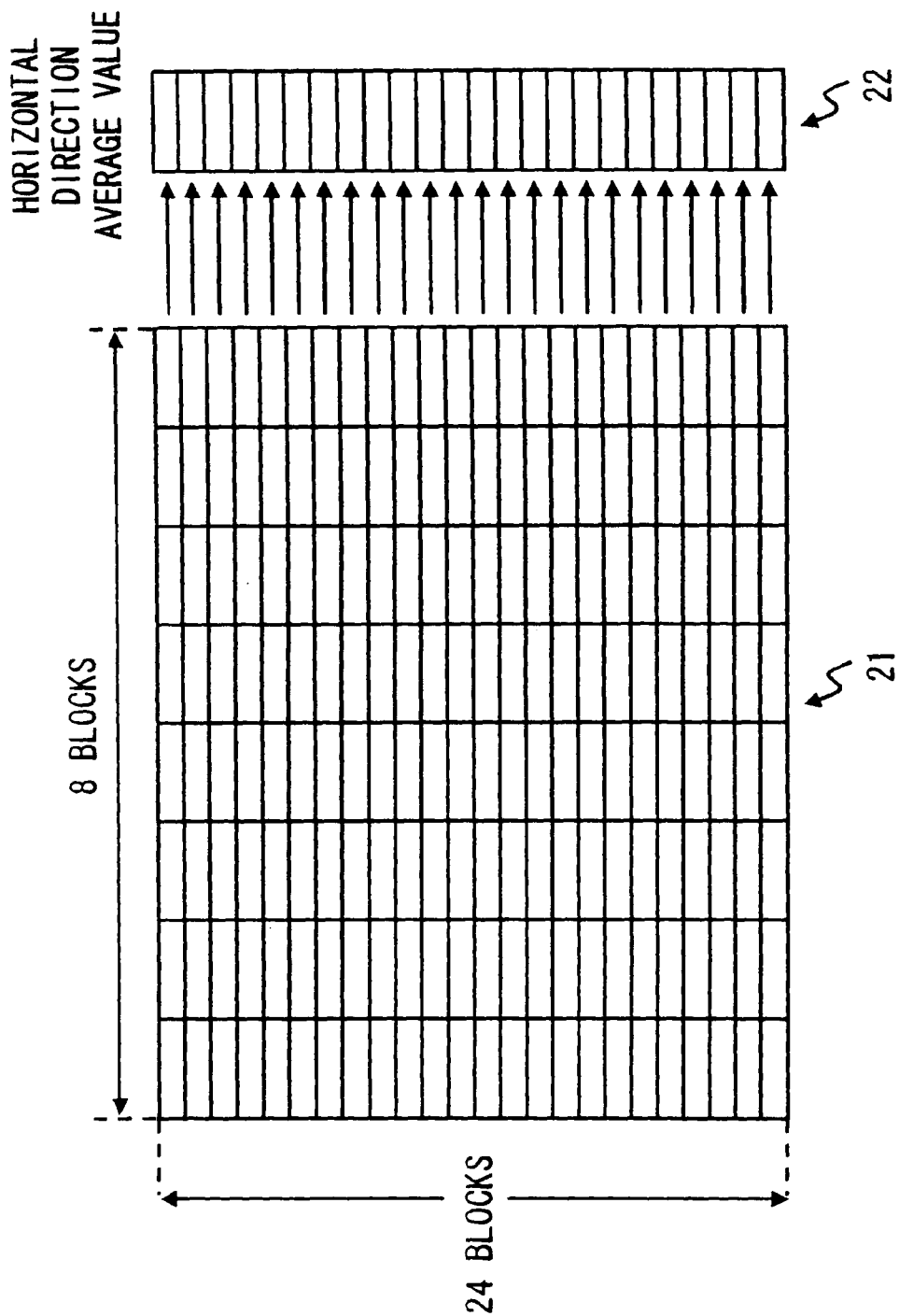
FIG. 2 A diagram for explaining an illustrative example of a difference image generation in the imaging apparatus 1 according to the first embodiment.

Note that it is needless to say that the example of FIG. 2 is only an example of a generation process of the difference image DP. That is, the difference image DP may be generated for the entire image plane of 1 frame image or a part of the image plane. To generate a difference image for a part of the image plane of the image, the number of lines including at least 1 cycle of bright and dark stripes corresponding to a cycle of the bright and dark stripes by a flicker in 1 image may be used. The cycle of bright and dark stripes by a flicker in 1 image can be computed using a blink cycle (or blink frequency) of the light source and 1 frame period (or frame rate) of the imaging apparatus 1.

Furthermore, as described using FIG. 2, instead of direct differences between pixel values, the difference image DP may be generated by differences between accumulated values obtained by accumulating pixel values or differences between average values of the pixel values with a predetermined partial region as a unit. Moreover, for example the difference image DP may be generated from differences of luminance values for the images P1 and P2. The luminance value for each pixel is generated from an image signal having color information of Bayer arrangement. Moreover, based on a G signal, which is the closest to the luminance signal among RGB signal, the difference image DP may be generated from differences of G signal values for the images P1 and P2.

Turning now to FIG. 1 to continue the explanation. In FIG. 1, a flicker detection unit 18 inputs the difference image DP generated by the difference image generation unit 17. The flicker detection unit 18 detects a flicker occurrence in the second image P2 according to a fluctuation of pixel value (luminance fluctuation) for the difference image DP in a vertical direction to scanning direction of the images P1 and P2, which is a vertical direction of the image plane of the difference image DP. Accordingly, the flicker detection unit 18 can be said to include a luminance fluctuation detection unit in the vertical direction of the image plane of the difference image DP. In other words, the flicker detection unit 18 can be said to include a bright and dark stripe detection unit for the difference image DP.

Figure 3A:
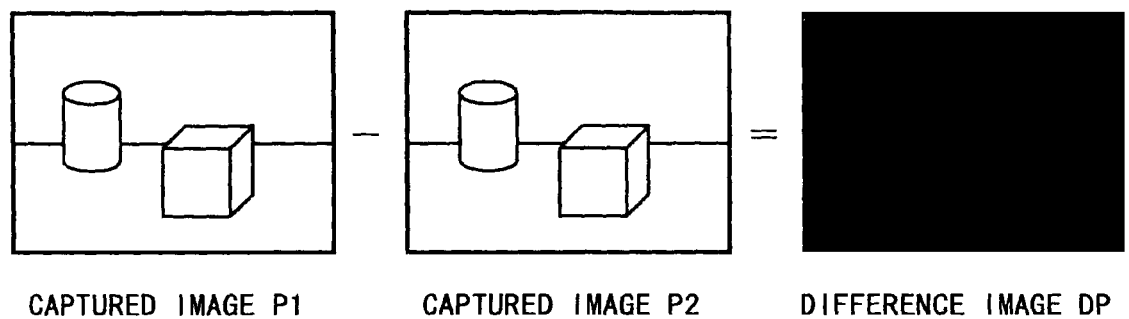
FIG. 3A A conceptual diagram for explaining a difference image generated by the imaging apparatus 1 according to the first embodiment.

Here, the principle of the flicker detection using the difference image DP is described with reference to FIGS. 3A and 3B. FIG. 3A shows a difference image DP for the image P1 captured in the charge accumulation time T1 and the image P2 captured in the charge accumulation time T2 when the capturing environment of the imaging apparatus 1 is not under a blinking light source, such as outside daylight. In the case of FIG. 3A, as a flicker does not occur in the images P1 and P2, the images P1 and P2 are the same images excluding a movement of a photographic subject and noise. Therefore, pixel values or luminance values of the difference image DP is ideally zero across the entire image plane and a luminance fluctuation in the vertical direction of the image plane of the difference image DP is not detected.

Figure 3B:
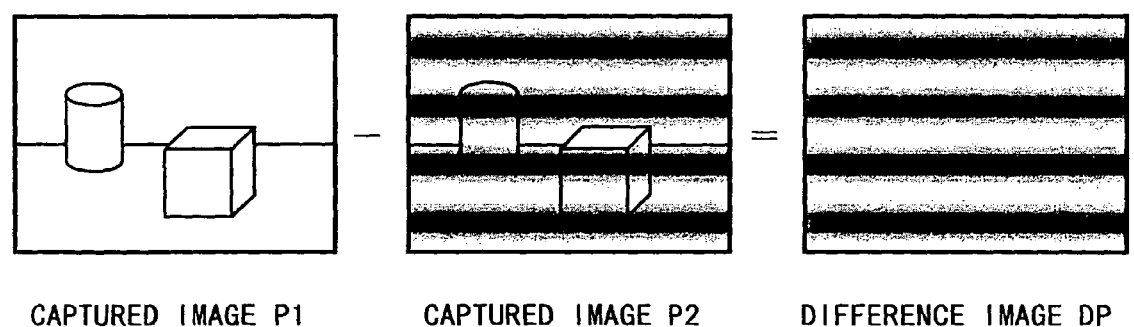
FIG. 3B A conceptual diagram for explaining a difference image generated by the imaging apparatus 1 according to the first embodiment.

On the other hand, FIG. 3B shows a difference image DP for the image P1 and image P2 captured under a blinking light source that blinks at the first blink cycle. In the case of FIG. 3B, as the charge accumulation time T1 of the image P1 is synchronized with the blink cycle of the light source, there is no flicker generated in the image P1. However, if the charge accumulation time T2 of the image P2 is not synchronized with the first blink cycle of the light source, a flicker occurs in the image P2. Therefore, bright and dark horizontal stripes by a flicker included in the image P2 are emphasized and appear in the difference image DP. That is, in the difference image DP, a luminance fluctuation appears along with the vertical direction. Accordingly, by the flicker detection unit 18 to detect the luminance fluctuation in the vertical direction of the difference image DP, an occurrence of a flicker in the second image P2 can be detected.

The detection of a luminance fluctuation in the vertical direction of the difference image DP can be possible by various methods. For example, the flicker detection unit 18 may detects a luminance fluctuation using a statistical analysis result of luminance value of the difference image DP. More specifically, the flicker detection unit 18 may compute average values and standard deviation or variance of luminance values in the vertical direction of the difference image DP, and may evaluates that the computed average values and standard deviation is closer to either average values and standard deviation of luminance value for the difference image DP without flicker or average values and standard deviation of luminance value for the difference image DP with flicker.

Moreover, the detection of a luminance fluctuation in the vertical direction of the difference image DP can be possible using a digital matched filter. Based on a blink cycle (or blink frequency) of a light source and 1 frame period (or frame rate) of the imaging apparatus 1, the number of horizontal stripes by a flicker included in 1 image frame can be theoretically computed. For example, if a blink frequency of a light source is 100 Hz and a capturing frame rate of the imaging apparatus 1 is 20 frames/second, the number of flicker stripes included in 1 image frame is theoretically 5. In this way, a reference waveform indicating the luminance fluctuation of the difference image DP caused by flicker stripes is theoretically calculated and a cross-correlation between the reference waveform and observed luminance fluctuation waveform of the difference image DP can be computed using a digital matched filter. Likewise, a cross-correlation between a reference waveform with no luminance fluctuation by a flicker (which is direct current waveform) and observed luminance fluctuation waveform of the difference image DP can be computed using a digital matched filter. This enables to determine whether the observed luminance fluctuation of the difference image DP is closer to the case with flicker or without flicker.

Moreover, alternatively, a Fourier transform may be executed to the difference image DP so as to detect a luminance fluctuation of the difference image DP based on a spatial frequency spectrum of the difference image DP.

Hereinafter, a flicker detection procedure by the imaging apparatus 1 is described with reference to the flowchart of FIG. 4. In the step S101, by the control of the exposure control unit 15, the CMOS sensor 10 executes image capturing with the charge accumulation time T1 to obtain the first image P1. Next, in the step S102, the exposure control unit 15 switches the charge accumulation time for the CMOS sensor 10 to the charge accumulation time T2, the CMOS sensor 10 executes image capturing with the charge accumulation time T2 to obtain the second image P2. In the step S103, the difference image generation unit 17 generates the difference image DP between the images P1 and P2. In the step S104, the flicker detection unit 18 detects a luminance fluctuation in the vertical direction of the difference image DP.

If the luminance fluctuation in the vertical direction is not detected in the step S104, it is detected that there is no flicker in the images P1 and P2, in other words, it is not the capturing environment that generates a flicker caused by a blink of a light source (step S105). On the other hand, if the luminance fluctuation of the difference image DP is detected in the step S104, it is detected that a flicker caused by a blink of a light source occurs in the image P2, in other words, it is the capturing environment that generates a flicker caused by a blink of a light source (step S106).

Figure 4:
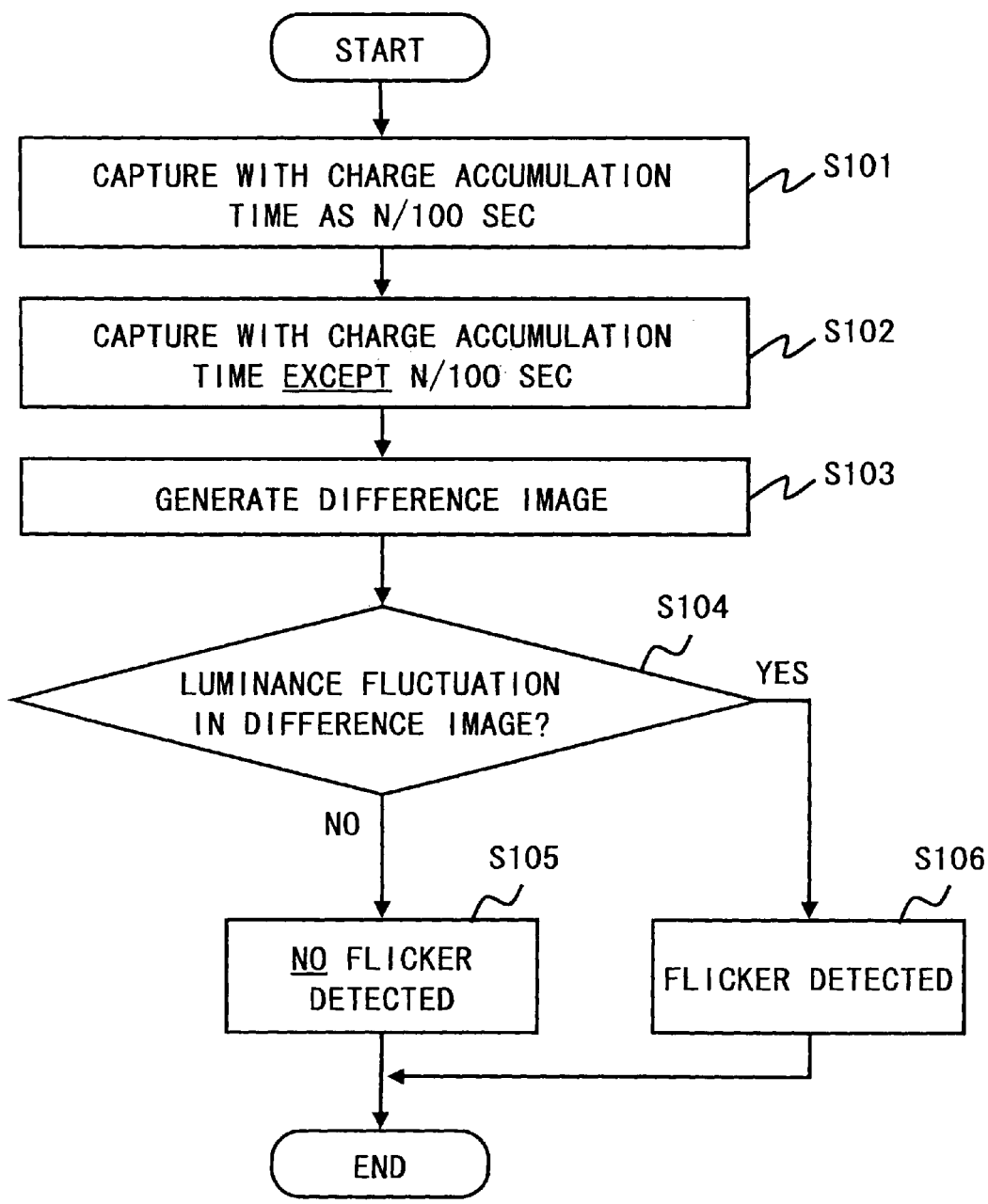
FIG. 4 A flowchart showing an example of a flicker detection procedure by the imaging apparatus 1 according to the first embodiment.

In the flowchart of FIG. 4, there is no limitation in the obtaining order of the images P1 and P2. That is, the image capture with the second charge accumulation time T2 may be performed before the image capture with the first charge accumulation time T1.

As described above, the imaging apparatus 1 according to this embodiment obtains 2 images P1 and P2 that are captured in different charge accumulation time, generates the difference image DP between the images P1 and P2 so as to extract differences in luminance between the 2 images P1 and P2 and detects a flicker by a luminance fluctuation in the vertical direction of the image DP (vertical direction to the scanning direction of the images P1 and P2).

In the image P2 obtained in the second charge accumulation time T2, horizontal stripes by a flicker appear even when 1 frame period of the image P2 is an integral multiple of a blink cycle of a light source. Accordingly, with the imaging apparatus 1 of this embodiment, by using the difference in luminance between the images P1 and P2, a flicker can be detected regardless of whether 1 frame period of images P1 and P2 is an integral multiple of a blink cycle of a light source. Therefore, the imaging apparatus 1 is able to reduce dependency of flicker detection accuracy to a frame rate, and improve the flicker detection accuracy.

Note that the imaging apparatus disclosed in patent citation 2 has another problem that as there are a large number of image frames required to detect a flicker, the time required to detect the flicker is long. As indicated in the formula (1), the imaging apparatus disclosed in patent citation 2 accumulates the amount of change in pixel values between image frames and a threshold evaluation to the flicker index value is performed with the accumulated value of the amount of change as a flicker index value. Thus the imaging apparatus disclosed in patent citation 2 requires at least 3 image frames to detect a flicker. Furthermore, it is considered that the method of patent citation 2 that requires many image frames to detect a flicker is likely to generate a false detection due to a change in the pixel values by a movement of a photographic subject. Moreover, in order to determine whether the fluctuation of the flicker index value is caused by a flicker or a photographic subject movement, patent citation 2 describes that the flicker index value must be measured across more number of frames (for example the paragraphs 63 to 79 in patent citation 2). Improving the evaluation accuracy in this way tends to worsen the abovementioned problem regarding the length of flicker detection time.

As compared with this, the imaging apparatus 1 of this embodiment is able to detect a flicker based on at least 2 image frames captured in different charge accumulation time. That is, as the number of image frames required to detect a flicker is small, the time required to detect a flicker can be reduced and there is an advantage that it is hard to generate a false detection caused by a change in pixel values due to a movement of a photographic subject.

Note that in a digital still camera or the like having the imaging apparatus 1 mounted thereto, the flicker detection by the imaging apparatus 1 is better to be performed at a power-on, when luminance of captured image by the CMOS sensor 10 largely changes and when capture mode such as an exposure adjustment that is preset to the digital still camera is changed by an operation of a user. Moreover, while the digital still camera or the like having the imaging apparatus 1 mounted thereto is operating, the images P1 and P2 may be repeatedly obtained with alternately switching the charge accumulation time to repeat to detect a flicker by the imaging apparatus 1. With such configuration, it is possible to quickly respond to a change in the capturing environment.

Moreover, the imaging apparatus 1 may obtain the images P1 and P2 for a plurality of times to generate a plurality of difference images DP so as to detect an occurrence of a flicker based on the plurality of difference images DP. For example, the difference images DP may be generated 4 times and if luminance fluctuations in the vertical direction of the difference images DP are detected consecutively 4 times, the imaging apparatus 1 may detect an occurrence of a flicker. With such configuration, the detection accuracy of an existence of a flicker can be improved.

Second Embodiment

If a digital still camera or the like having the imaging apparatus 1 according to the first embodiment is used only in an environment and a region where a blink cycle of a light source is the first blink cycle ($1/100$ second in this embodiment), by the flicker detection procedure shown in FIG. 4, it is possible to detect a occurrence of a 100 Hz flicker. However, considering the case when the digital still camera or the like having the imaging apparatus 1 is used in several environment and regions with different blink cycles of a light source, a flicker occurrence can be detected by the procedure of FIG. 4 but it is not possible to detect which blink frequency of the light source the flicker is generated from. Therefore, only by the procedure of FIG. 4, the configuration such as the charge accumulation time for the CMOS sensor 10 and the gain for the amplifier 12 cannot be changed in order to prevent an occurrence of a flicker. Thus, variation examples of the flicker detection procedure shown in FIG. 4 are described with reference to FIGS. 5 and 6.

Figure 5:
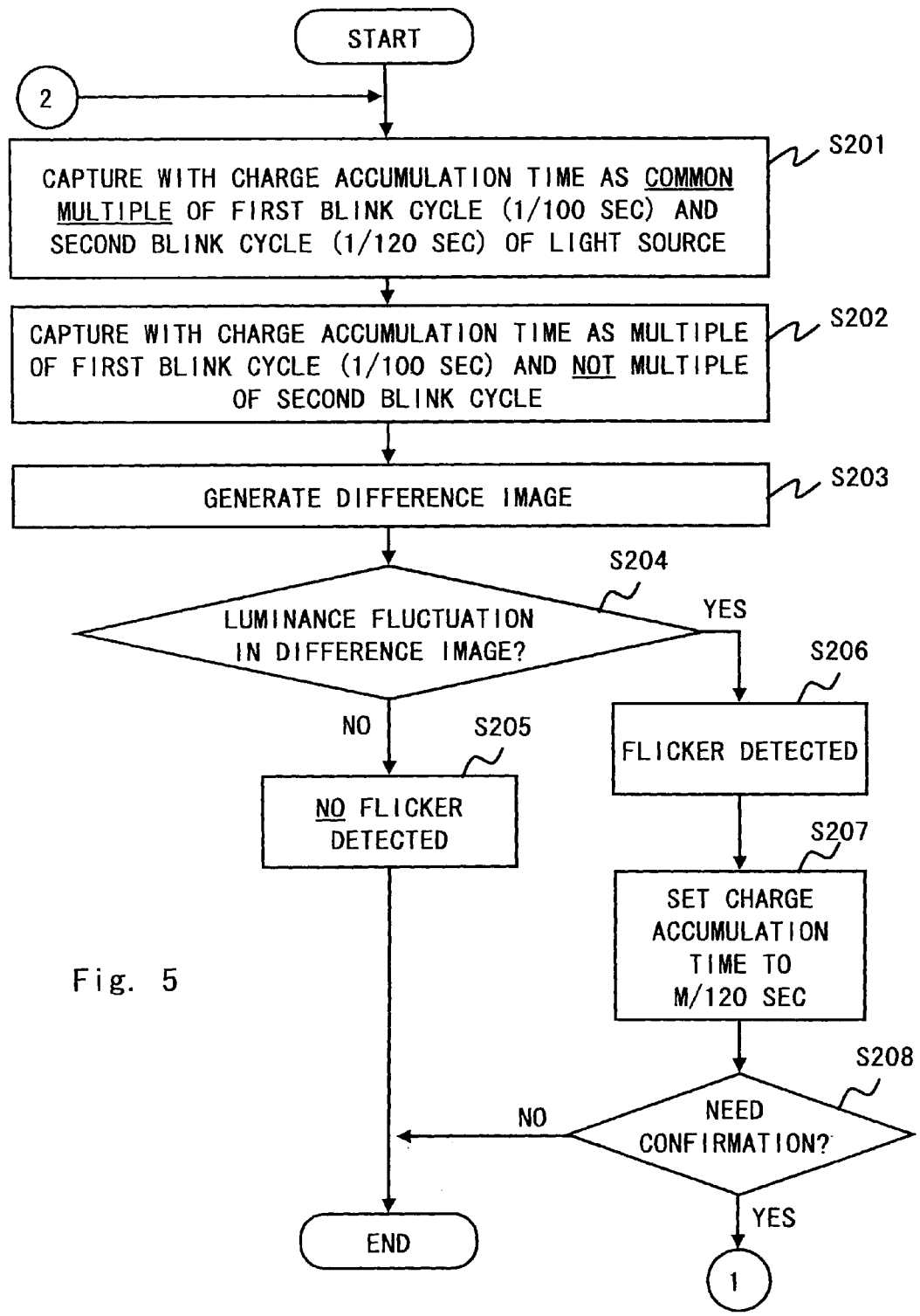
FIG. 5 A flowchart showing a flicker detection procedure by the imaging apparatus 1 according to a second embodiment of the present invention.
Figure 6:
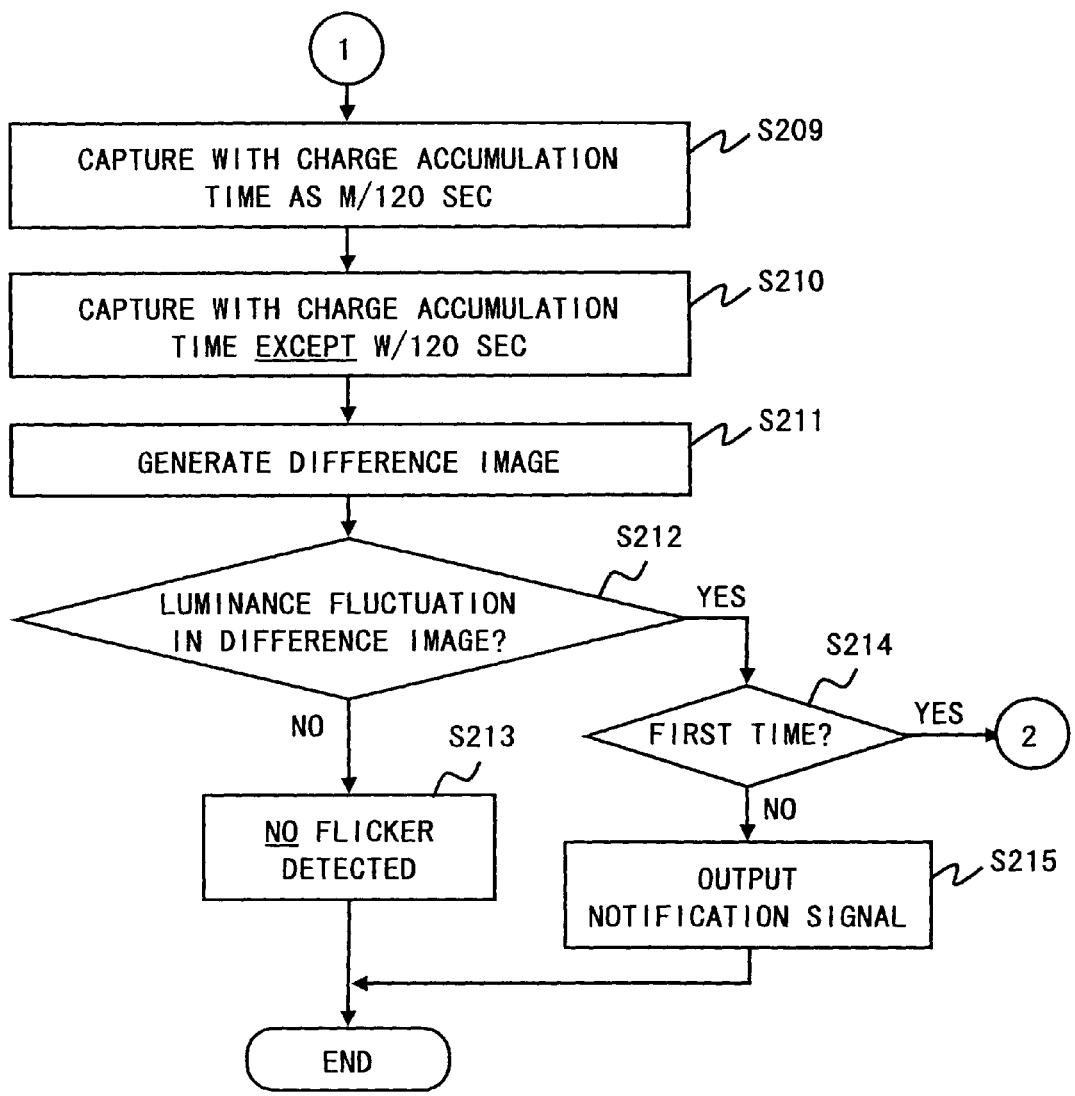
FIG. 6 A flowchart showing a flicker detection procedure by the imaging apparatus 1 according to the second embodiment.

The flowcharts of FIGS. 5 and 6 show an example of a flicker detection procedure that enables to change configuration of the CMOS sensor 10 and amplifier 12 for avoiding an occurrence of a flicker by identifying a blink frequency of a light source. In the example of FIGS. 5 and 6, an environment where the blink cycle of a light source is either the first blink cycle ($1/100$ second) or the second blink cycle ($1/120$ second) is described as an example.

In the step S201, the CMOS sensor 10 executes image capturing with the charge accumulation time T1 which is a common multiple of the first blink cycle ($1/100$ second) and the second blink cycle ($1/120$ second) to obtain the first image P1. That is, the first charge accumulation time T1 is a time that does not generate a flicker in a captured image of the CMOS sensor 10 in an environment under either of the light sources that blinks at the first blink cycle and that blinks at the second blink cycle. More specifically, the first charge accumulation time T1 is set to 10N/100 second, for example $10/100$ second.

In the step S202, the CMOS sensor 10 executes image capturing with the charge accumulation time T2, which is a multiple of the first blink cycle ($1/100$ second) and not a multiple of the second blink cycle ($1/120$ second) to obtain the second image P2. That is, the second charge accumulation time T2 does not generate a flicker in a captured image under a light source that blinks at the first blink cycle, but the second charge accumulation time T2 generates a flicker in a captured image under a light source that blinks at the second blink cycle. For example, the second charge accumulation time T2 is set to $12/100$ second.

In the step S203, the difference image generation unit 17 generates a difference image DP1 between the images P1 and P2. In the step S204, the flicker detection unit 18 detects an existence of luminance fluctuation in the vertical direction of the difference image DP1.

Here, as a first case, the case is considered when the capture of the images P1 and P2 is performed under the light source that blinks at the first blink cycle ($1/100$ second). In the first case, a flicker does not occur in both of the images P1 and P2. Therefore, the images P1 and P2 are the same images excluding a movement of a photographic subject and noise, thus a luminance fluctuation in the vertical direction of the difference image DP1 is not detected. Accordingly, in the first case, no flicker is detected (step S205). This enables to determine that the current capturing environment is an environment that does not generate a flicker in the captured image with the charge accumulation time as at least N/100 second (under the light source that blinks at the first blink cycle or an environment such as outdoor without a flicker).

Next, as a second case, the case is considered when the capture of the images P1 and P2 is performed under the light source that blinks at the second blink cycle ($1/120$ second) In the second case, a flicker does not occur in the image P1 but a flicker occurs in the image P2. Thus the luminance fluctuation in the vertical direction of the difference image DP1 is detected in the step S104. Accordingly, a flicker occurrence is detected in the second case (step S206). It is apparent from the principle of occurrence of a flicker that the flicker in this case is not caused by the light source that blinks at the first blink cycle ($1/100$ second). Therefore, if options of a blink cycle of a light source is only 2 ways, which are the first blink cycle ($1/100$ second) and second blink cycle (1/120 second), it can be determined that the capturing environment of the images P1 and P2 is under the light source of the second blink cycle (1/120 second).

Therefore, if a flicker occurrence is not detected in the abovementioned steps S201 to S206, the charge accumulation time for the CMOS sensor 10 when performing a normal capture by an instruction from a user may be set to N/100 second. Moreover, if the charge accumulation time for the CMOS sensor 10 at a normal capture is already set to N/100 second, this configuration can be continued. In the meantime, if a flicker occurrence is detected in the abovementioned steps S201 to 206, the charge accumulation time for the CMOS sensor 10 at a normal capture may be set to M/120 second. Here, N and M are positive integers.

As described above, if the options of a blink cycle of a light source is only 2 ways, which are the first blink cycle (1/100 second) and second blink cycle (1/120 second), by a detection of a flicker occurrence (step S206), it can be determined that the capturing environment of the images P1 and P2 is under the light source of the second blink cycle (1/120 second). Thus in the step S207, the charge accumulation time for the CMOS sensor 10 at a normal capture is configured to M/120 second. After that, if determined that the confirmation process after the step S208 is unnecessary, the flicker detection process may be ended here.

On the other hand, in the step S208, if determined that an additional confirmation process is necessary, the process proceeds to the confirmation process shown in FIG. 6. In the steps S209 and S210, the CMOS sensor 10 executes image capturing with the charge accumulation time as M/120 second and W/120 second to obtain images P3 and P4. Here, M and W are positive integers. Moreover, as described with FIG. 5, it is preferable to select that either of M/120 second or W/120 second is a common multiple of 1/100 second and 1/120 second and another is not a common multiple of 1/100 second and 1/120 second.

In the step S211, a difference image DP2 between the images P3 and P4 is generated. In the step S212, a luminance fluctuation in the vertical direction of the generated difference image DP2 is detected. In this case, if there is no failure or the like in the imaging apparatus 1, the luminance fluctuation in the vertical direction of the difference image DP2 is not detected and the flicker detection process is ended (step S213). On the other hand, in an exceptional case that the luminance fluctuation in the vertical direction of the difference image DP2 is detected, return to the step S201 again and the flicker detection process is executed again (step S214). As a result of the re-execution of the flicker detection process, if the luminance fluctuation is detected again in the step S213, some kind of abnormal event such as a failure of the imaging apparatus 1 is considered to occur. Thus some sort of a notification signal is output to outside of the imaging apparatus 1. The notification signal here may be an electric signal for notifying an occurrence of the abnormal event to an external processor or may be a signal for display or audio output to notify to a user.

FIGS. 5 and 6 are explained assuming the case that the blink cycle of a light source is 2 ways, which are assumed to be a cause of an occurrence of a flicker. Therefore, if the blink cycle of a light source to be a cause of an occurrence of a flicker is 3 ways or more, in the step S212 of FIG. 6, the luminance fluctuation in the vertical direction of the difference image DP2 may be detected. In this case, the charge accumulation time for the CMOS sensor 10 is configured to the time corresponding to a third blink cycle and a further confirmation process that a flicker is not generated in the charge accumulation time corresponding to the third blink cycle may be performed in the same way as the procedure of FIG. 6.

After performing the flicker detection process by the procedure explained above to obtain charge accumulation time that is not a cause of a flicker occurrence, by the exposure control unit 15 configuring a pulse transmission timing for the timing generator 16 and the gain for the amplifier 12 in order to perform a normal capture by the charge accumulation time that does not make a flicker, it is possible to obtain a image without flicker. This enables to improve the convenience for users of a digital still camera or the like having the imaging apparatus 1 mounted thereto. Note that the timing to perform the detection process of a flicker may be various timings described in the first embodiment of the present invention such as at a power-on.

Moreover, in FIG. 5, an example is illustrated in which an existence of a flicker is detected by detecting the luminance fluctuation of the difference image DP1 of the images P1 and P2 obtained in 2 times of captures. However, as with the abovementioned first embodiment of the present invention, the images P1 and P2 may be repeatedly obtained to repeat flicker detection. With such configuration, it is possible to quickly respond to a change in the capturing environment. Alternatively, as with the abovementioned first embodiment of the present invention, the images P1 and P2 may be obtained for a plurality of times to generate a plurality of difference images DP1 so as to detect an occurrence of a flicker based on the plurality of difference images DP1. With such configuration, the detection accuracy of an occurrence of a flicker can be improved. Note that it is needless to say that this is not limited to FIG. 5 but also applies to FIG. 6.

Third Embodiment

The imaging apparatus 1 according to the abovementioned first or the second embodiment of the present invention is explained with the configuration that detects a flicker by existence of a luminance fluctuation of the difference image DP generated using 2 images P1 and P2 captured in different charge accumulation time. An imaging apparatus 2 of this embodiment is configured to further detect a blink frequency of a light source, which is a flicker frequency, based on a cycle of a luminance fluctuation in the vertical direction of the image plane of the difference image DP (fluctuation cycle of pixel value). Such configuration is especially effective when a digital still camera or the like having the imaging apparatus 2 is used in the region where the blink frequency of a light source that generates a flicker in the image of the CMOS sensor 10 is in 2 ways as in Japan. The commercial power supply has a frequency of 50 or 60 Hz in Japan. Hereinafter, the configuration of the imaging apparatus 2 and a flicker detection procedure according to this embodiment are described in detail.

Figure 7:
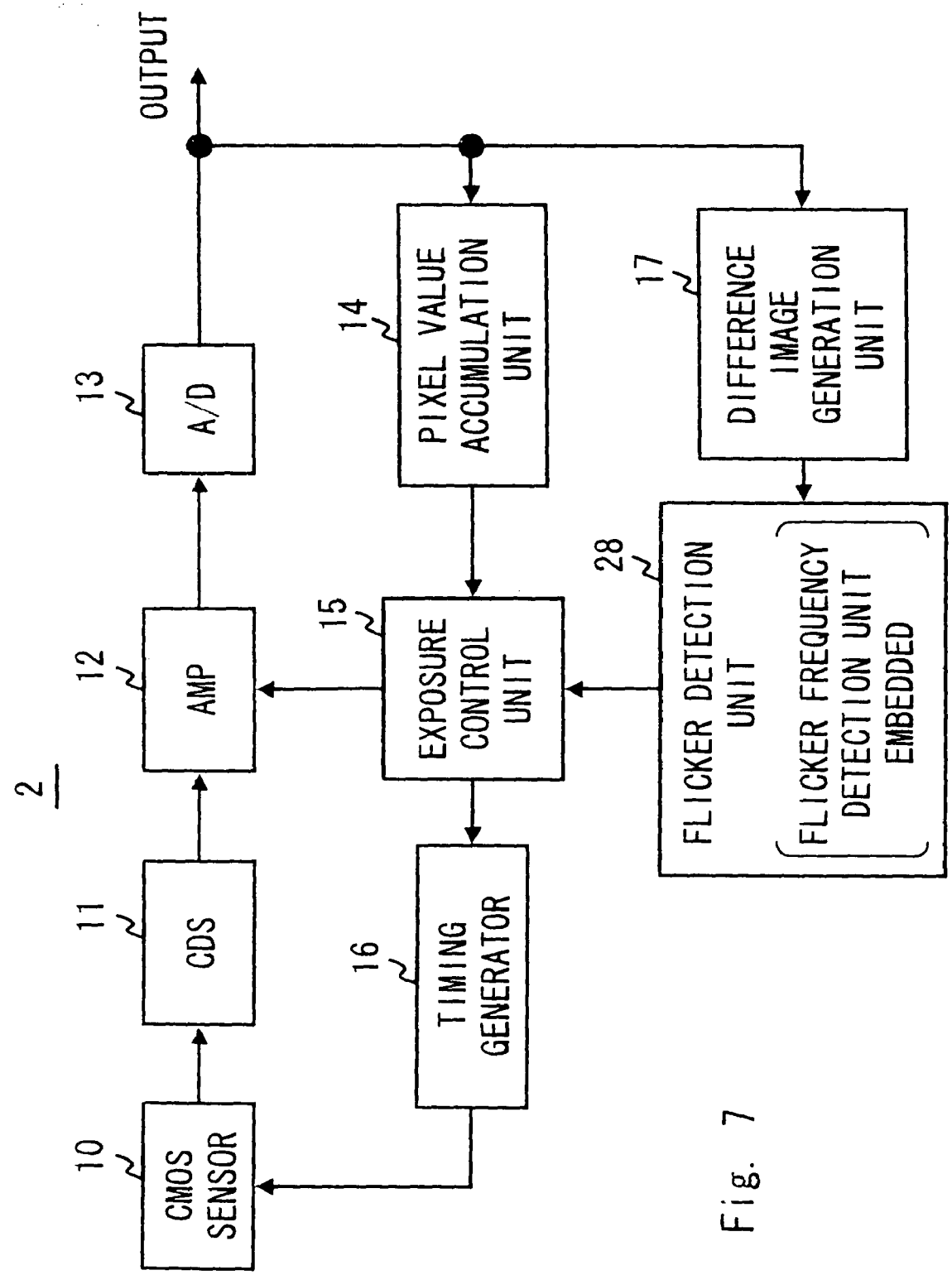
FIG. 7 A block diagram of an imaging apparatus 2 according to a third embodiment of the present invention.

The block diagram of the imaging apparatus 2 is shown in FIG. 7. In FIG. 7, components except a flicker detection unit 28 are identical to those included in the abovementioned imaging apparatus 1, thus the components are denoted by the reference numerals in FIG. 1 and detailed explanation for the components are omitted. Note that the exposure control unit 15 included in the imaging apparatus 2 is similar to the imaging apparatus 1 in the point that a capture is performed by alternately switching the charge accumulation time for the CMOS sensor 10 between 2 charge accumulation time of T1 and T2. However, the charge accumulation times T1 and T2 at this time are configured respectively to the first blink cycle (for example 1/100 second) and second blink cycle (for example 1/120 second) of a light source. Hereinafter, in this embodiment, it is explained that the first blink cycle of a light source is 1/100 second and the first charge accumulation time T1 corresponding to this is N/100 second. Moreover, it is explained that the second blink cycle of a light source is 1/120 second and the second charge accumulation time T2 corresponding to this is M/120 second. Here, N and M are positive integers. However the second charge accumulation time T2 is determined to be a value except integral multiples of the first blink cycle of the light source "1/100 second".

The flicker detection unit 28 inputs the difference image DP generated by the difference image generation unit 17 to detect a flicker occurrence in the first image P1 or second image P2 according to a fluctuation of pixel value (luminance fluctuation) in the vertical direction of the image plane of the difference image DP. Furthermore, by analyzing a period of the luminance fluctuation in the vertical direction of the image plane of the difference image DP, the flicker detection unit 28 detects which of the image P1 and P2 a flicker is generated in, in other words, detects that the capturing environment is either under a light source of the first blink cycle (1/100 second) or second blink cycle (1/120 second). That is, the flicker detection unit 28 can be said to include a flicker frequency detection unit for detecting a frequency of the luminance fluctuation of the difference image DP (which is flicker frequency). Therefore, in FIG. 7, to clarify the difference from FIG. 1, there is a description saying flicker frequency detection unit embedded in the block of the flicker detection unit 28.

When generating the difference image DP with the first charge accumulation time T1 as N/100 second and second charge accumulation time T2 as M/120 second, as described in the first embodiment of the present invention, by detecting an existence of a luminance fluctuation in the vertical direction of the image plane of the difference image DP, it is possible to detect whether a flicker is generated or not. However, by detecting only an existence of a luminance fluctuation of the difference image DP, it is not possible to determine whether the capturing environment of the imaging apparatus 2 is under a light source of 100 Hz flicker or a light source of 120 Hz flicker. Thus in this embodiment, by analyzing a period or a frequency of the luminance fluctuation of the difference image DP in the following way, the flicker frequency of the capturing environment is determined.

Figure 8A:
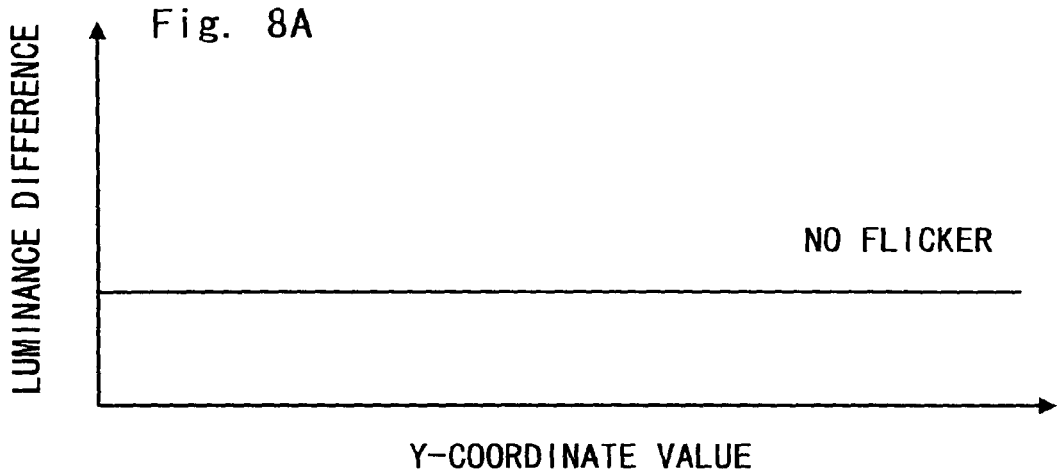
FIG. 8A A diagram for explaining a detection of a flicker and a detection of a flicker frequency using a difference image by the imaging apparatus 2 according to a third embodiment.
Figure 8B:
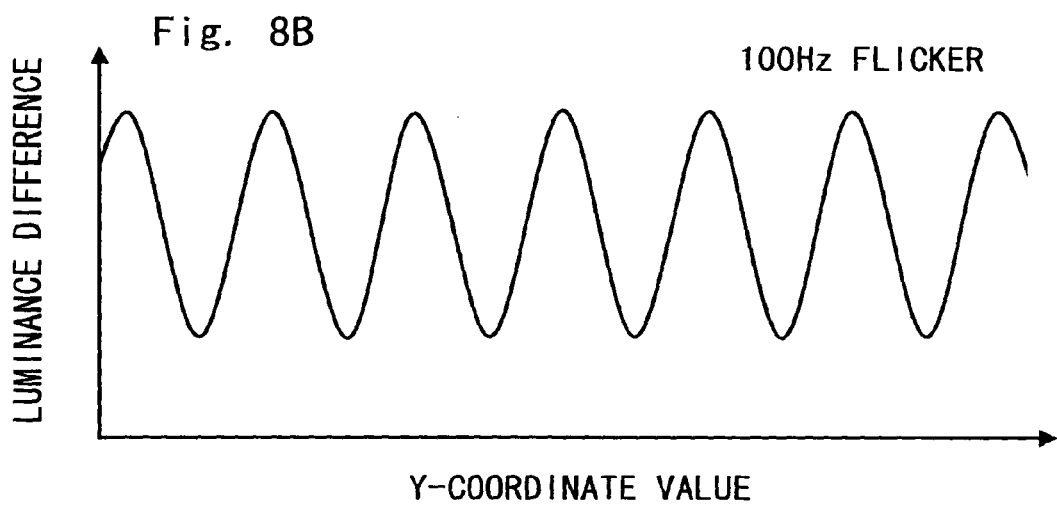
FIG. 8B A diagram for explaining a detection of a flicker and a detection of a flicker frequency using a difference image by the imaging apparatus 2 according to the third embodiment.
Figure 8C:
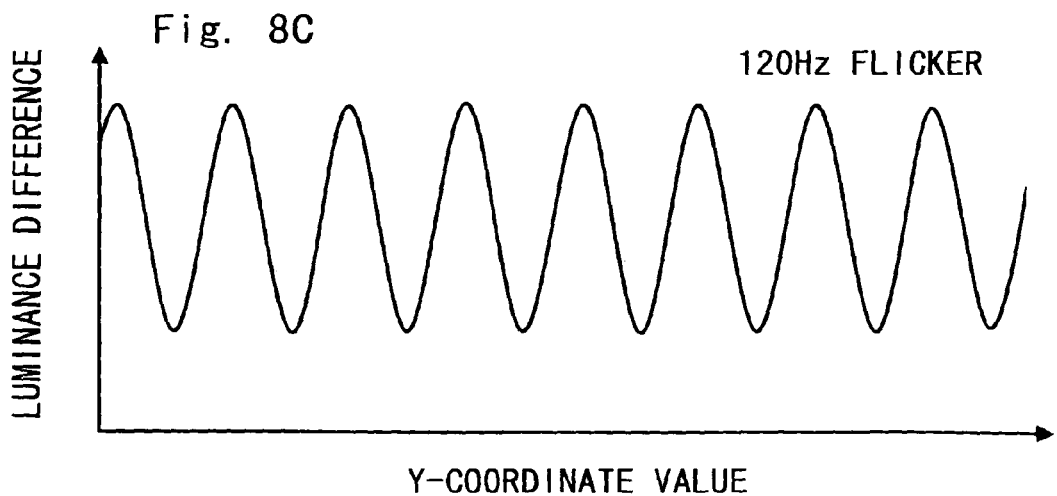
FIG. 8C A diagram for explaining a detection of a flicker and a detection of a flicker frequency using a difference image by the imaging apparatus 2 according to the third embodiment.

FIGS. 8A to 8C are conceptual diagrams showing waveforms of a luminance fluctuation in the screen vertical direction of the difference image DP. FIG. 8A shows a luminance fluctuation of the difference image DP when a flicker is not generated in either of the images P1 and P2. In this case, the images P1 and P2 are the same images excluding a movement of a photographic subject and noise. Therefore, pixel values (luminance) of the difference image DP represent a direct current waveform as in FIG. 8A.

FIG. 8B shows a luminance fluctuation of the difference image DP when a blink frequency of a light source is 100 Hz and a flicker is generated in the image P2. A fluctuation frequency of pixel values (luminance) of the difference image DP in this case is determined according to the blink frequency (100 Hz) of the light source and a frame rate when capturing the images P1 and P2.

Furthermore, FIG. 8C shows a luminance fluctuation of the difference image DP when a blink frequency of a light source is 120 Hz and a flicker is generated in the image P1. The fluctuation frequency of pixel values (luminance) of the difference image DP in this case is determined according to the blink frequency (120 Hz) of the light source and a frame rate when capturing the images P1 and P2.

As shown in FIGS. 8B and 8C, the frequency of the luminance fluctuation of the difference image DP is proportional to the blink frequency of light source. Therefore, by analyzing the period or frequency of the luminance fluctuation of the difference image DP, it can be determined which of the 100 Hz flicker and 120 Hz flicker is generated.

The analysis of the luminance fluctuation frequency in the vertical direction of the difference image DP by the flicker detection unit 28 can be performed using a digital matched filter. More specially, a reference waveform A indicating a luminance fluctuation of the difference image DP when a blink frequency of a light source is 100 Hz (100 Hz flicker) and a reference waveform B indicating a luminance fluctuation of the difference image DP when the blink frequency of the light source is 120 Hz (120 Hz flicker) are prepared in advance. Next, a cross-correlation between the observed luminance fluctuation of the difference image DP and the reference waveforms A and B is computed by a digital matched filter. Then, it may be evaluated which of the reference waveforms A and B is closer to the observed luminance fluctuation waveform of the difference image DP according to the computed cross-correlation value.

Furthermore, alternatively, the flicker detection unit 28 may be configured to execute a Fourier transform to the difference image DP and detect the luminance fluctuation of the difference image DP based on a spatial frequency spectrum of the difference image DP. Moreover, if the frame rate of the CMOS sensor 10 is large, the number of horizontal stripes caused by a flicker included in the image P1 or P2 relatively becomes small. In such case, the flicker detection unit 28 may measure a number of pixels in the vertical direction of the horizontal stripe included in the difference image DP and may evaluate a flicker frequency by which of the horizontal stripes by 100 Hz flicker and 120 Hz flicker the number corresponds to.

Figure 9:
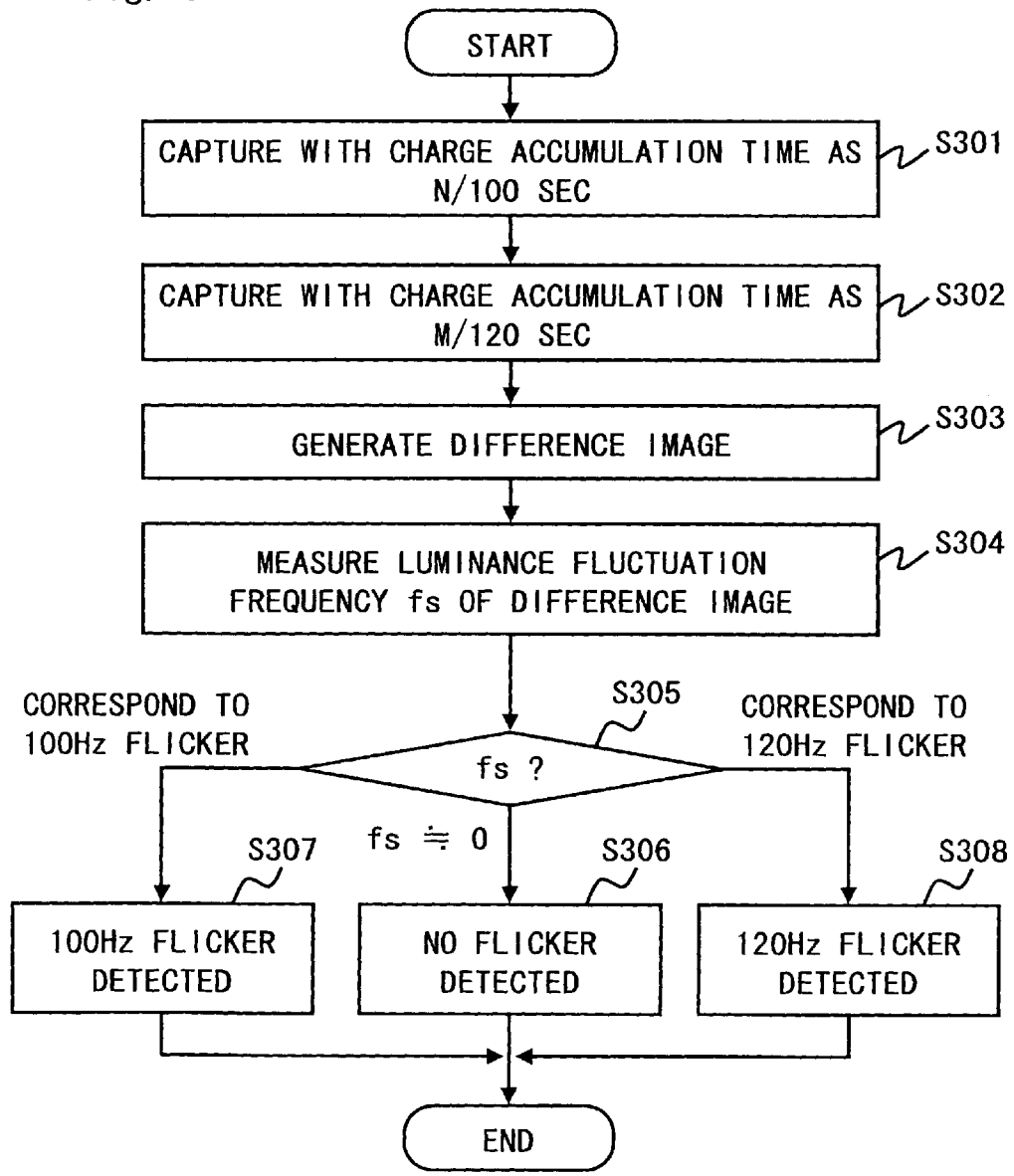
FIG. 9 A flowchart showing a flicker detection procedure by the imaging apparatus 2 according to the third embodiment.

Hereinafter, a flicker detection procedure by the imaging apparatus 2 is described with reference to the flowchart of FIG. 9. In the step S301, by the control of the exposure control unit 15, the CMOS sensor 10 executes image capturing with the charge accumulation time T1 (N/100 second) to obtain the first image PE. Next, in the step S302, the exposure control unit 15 switches the charge accumulation time for the CMOS sensor 10 to the second charge accumulation time T2 (M/120 second), the CMOS sensor 10 executes an image capture with the charge accumulation time T2 to obtain the second image P2. In the step S303, the difference image generation unit 17 generates the difference image DP between the images P1 and P2. In the step S304, the flicker detection 28 measures luminance fluctuation frequency fs in the vertical direction of the difference image DP.

The flicker detection unit 28 detects "no flicker" if the measured luminance fluctuation frequency is almost zero, that is, the luminance fluctuation waveform of the difference image DP is close to a direct current waveform (steps S305 and S306). Furthermore, if the measured luminance fluctuation frequency fs is a frequency corresponding to 100 Hz flicker of a light source, the flicker detection unit 28 detects that the 100 Hz flicker caused by a blink of a light source is generated in the image P2, in other words, it is the capturing environment that generates the 100 Hz flicker caused by the blink of the light source (steps S305 and 307). Moreover, if the measured luminance fluctuation frequency fs is a frequency corresponding to 120 Hz flicker of a light source, the flicker detection unit 28 detects that the 120 Hz flicker caused by a blink of a light source is generated in the image P1, in other words, it is the capturing environment that generates the 120 Hz flicker caused by the blink of the light source (steps S305 and 308).

As described above, the imaging apparatus 2 of this embodiment obtains the images P1 and P2 by 2 charge accumulation times of T1 and T2 that each is synchronized with 2 ways of blink frequencies of a light source, and generates the difference image DP between the image P1 and P2. Furthermore, the imaging apparatus 2 is configured to detect which of the 2 ways of blink frequencies (for example 100 Hz and 120 Hz) the flicker is caused by, by analyzing a period or a frequency of a luminance fluctuation in the vertical direction of the image plane of the difference image DP, which is a direction vertical to scanning direction of the images P1 and P2. Note that the configuration change and the response to a normal capture in the exposure control unit 15 or the like after detecting a flicker are almost same as the content described in the abovementioned first and the second embodiments, thus a new explanation is omitted here.

With such configuration, not only the detection of a flicker but also the detection of a flicker frequency can be performed. Moreover, with such configuration, not only in the region such as in Japan where 2 ways of power frequencies 50 Hz and 60 Hz are used, but in the region such as Europe where power supply frequency is only 50 Hz and North America where power supply frequency is only 60 Hz, a flicker detection is possible. Therefore, the imaging apparatus 2 can be used generally regardless of usage region.

Note that the timing to perform the detection process of a flicker in a digital still camera or the like having the imaging apparatus 2 mounted thereto may be various timings described in the first embodiment of the present invention such as at a power-on.

Moreover, the imaging apparatus 2 may obtain the images P1 and P2 for a plurality of times to generate a plurality of difference images DP so as to detect an occurrence of a flicker based on the plurality of difference images DP. For example, the difference images DP may be generated 4 times and if a luminance fluctuation in the vertical direction of the difference images DP are detected consecutively 4 times and the flicker frequency is constant, the imaging apparatus 2 may detect an occurrence of a flicker. With such configuration, it is possible to suppress an erroneous decision for an existence of a flicker and a flicker frequency and improve the detection accuracy of an existence of a flicker and a flicker frequency.

It is apparent that the present invention is not limited to the above embodiments, but may be modified and changed without departing from the scope and spirit of the invention.

Note that in the scope of the present invention supported by the abovementioned embodiments of the present invention, the apparatuses and method listed in the following are included.

Other Embodiment of the Present Invention 1

An imaging apparatus comprising:
an imaging sensor;
a control unit configured to control capturing first image by the imaging sensor adjusted to first charge accumulation time and control capturing second image by the imaging sensor adjusted to second charge accumulation time, the first charge accumulation time not causing a flicker in an image captured by the imaging sensor under a light source blinking at a first blink cycle, the second charge accumulation time being different from the first charge accumulation time;
a difference image generation unit configured to generate a difference image between the first image and the second image; and
a flicker detection unit configured to detect a flicker occurrence in the second image based on a fluctuation of pixel values of the difference image in a vertical direction to a scanning direction of the first and the second images,
wherein the difference image is generated by calculating a difference in an accumulated value of pixel values in a horizontal direction of the first image and an accumulated value of pixel values in the horizontal direction of the second image.

Other Embodiment of the Present Invention 2

The imaging apparatus according to other embodiment of the present invention 1, wherein the generation of the difference image by the difference image generation unit is performed for a part of the first and the second images.

Other Embodiment of the Present Invention 3

An imaging apparatus comprising:
an imaging sensor;
a control unit configured to control capturing first image by the imaging sensor adjusted to first charge accumulation time and control capturing second image by the imaging sensor adjusted to second charge accumulation time, the first charge accumulation time not causing a flicker in an image captured by the imaging sensor under a light source blinking at a first blink cycle, the second charge accumulation time being a cause of a flicker in an image captured by the imaging sensor under the light source blinking at the first blink cycle; and
a flicker detection unit configured to detect a flicker occurrence in the second image based on a difference in luminance between the first image and the second image,
wherein the first charge accumulation time is an integral multiple of $1/100$ second and the second charge accumulation time is an integral multiple of $1/120$ second.

Other Embodiment of the Present Invention 4

A method of detecting a flicker comprising:
switching charge accumulation time for an imaging sensor between first charge accumulation time and second charge accumulation time so as to execute capturing first image by the imaging sensor adjusted to the first charge accumulation time and capturing second image by the imaging sensor adjusted to the second charge accumulation time, the first charge accumulation time being synchronized with a first blink cycle of a light source and not causing a flicker in a captured image under the light source blinking at the first blink cycle, the second charge accumulation time being different from the first charge accumulation time; and
detecting a flicker occurrence in the second image based on a difference in luminance between the first image and the second image,
wherein the capturing by the first charge accumulation time and the capturing by the second charge accumulation time are repeated alternately, and
the detection of the flicker occurrence in the second image is repeated using the first and the second images repeatedly captured alternately.

Other Embodiment of the Present Invention 5

A method of detecting a flicker comprising:
switching charge accumulation time for an imaging sensor between first charge accumulation time and second charge accumulation time so as to execute capturing first image by the imaging sensor adjusted to the first charge accumulation time and capturing second image by the imaging sensor adjusted to the second charge accumulation time, the first charge accumulation time being synchronized with a first blink cycle of a light source and not causing a flicker in a captured image under the light source blinking at the first blink cycle, the second charge accumulation time being different from the first charge accumulation time;

generating a difference image between the first and the second images; and detecting a flicker occurrence in the second image based on a fluctuation of pixel values of the difference image in a vertical direction to a scanning direction of the first and the second images.

Other Embodiment of the Present Invention 6

The method according to other embodiment of the present invention 5, wherein the difference image is generated by calculating a difference in pixel values between each corresponding pixel for the first and the second images.

Other Embodiment of the Present Invention 7

The method according to other embodiment of the present invention 5, wherein the difference image is generated by calculating a difference in an accumulated value of pixel values in a horizontal direction of the first image and an accumulated value of pixel values in the horizontal direction of the second image.

Other Embodiment of the Present Invention 8

The method according to other embodiment of the present invention 6 or 7, wherein the difference image is generated for a part of the first and the second images.

Other Embodiment of the Present Invention 9

The method according to other embodiment of the present invention 5, wherein the second charge accumulation time causes a flicker in a captured image under the light source blinking at the first blink cycle, and the second charge accumulation time is synchronized with a second blink cycle of the light source and does not cause a flicker in a captured image under the light source blinking at the second blink cycle.

Other Embodiment of the Present Invention 10

The method according to other embodiment of the present invention 9, wherein the first charge accumulation time is an integral multiple of 1/100 second and the second charge accumulation time is an integral multiple of 1/120 second.

Other Embodiment of the Present Invention 11

The method according to other embodiment of the present invention 9, wherein the detecting the flicker occurrence includes detecting which of the first or the second image a flicker is generated in according to a fluctuation period or a fluctuation frequency of pixel values of the difference image in a vertical direction to a scanning direction of the first and the second images.

Other Embodiment of the Present Invention 12

An imaging apparatus comprising:
an imaging sensor;
means for controlling capturing first image by the imaging sensor adjusted to first charge accumulation time and capturing second image by the imaging sensor adjusted to second charge accumulation time, the first charge accumulation time not causing a flicker in an image captured by the imaging sensor under a light source blinking at a first blink cycle, the second charge accumulation time being not synchronized with the first blink cycle and being a cause of a flicker in an image captured by the imaging sensor under the light source blinking at the first blink cycle;

means for generating a difference image between the first image and the second image; and means for detecting a flicker occurrence in the second image based on the difference image.

The invention claimed is:

1. An imaging apparatus comprising:

an imaging sensor;

a control unit configured to control capturing a first image by the imaging sensor adjusted to a first charge accumulation time and capturing a second image by the imaging sensor adjusted to a second charge accumulation time, the first charge accumulation time not causing a flicker in an image captured by the imaging sensor under a light source blinking at a first blink cycle, the second charge accumulation time being different from the first charge accumulation time and causing a flicker in a captured image under the light source blinking at the first blink cycle;

a flicker detection unit configured to detect a flicker occurrence in the first image or the second image based on a difference in luminance between the first image and the second image; and a difference image generation unit configured to generate a difference image between the first image and the second image.

wherein the second charge accumulation time is synchronized with a second blink cycle of the light source and does not cause a flicker in a captured image under the light source blinking at the second blink cycle, and wherein the flicker detection unit detects which of the first image and the second image a flicker is generated in according to at least one of both a fluctuation period and a fluctuation frequency of pixel values of the difference image in a vertical direction to a scanning direction of the first image and the second image.

2. The imaging apparatus according to claim 1, wherein the control unit controls the imaging sensor, wherein the imaging sensor repeatedly and alternately captures the first image and the second image a plurality of times, and wherein the first image is repeatedly and alternately captured using the first charge accumulation time and the second image is repeatedly and alternately captured using the second charge accumulation time.

3. The imaging apparatus according to claim 1, wherein, the flicker detection unit detects a flicker occurrence in the first or second image based on a fluctuation of pixel values of the difference image in the vertical direction to the scanning direction of the first image and the second image.

4. The imaging apparatus according to claim 3, wherein the difference image is generated by calculating a difference in pixel values between each corresponding pixel for the first image and the second image.

5. The imaging apparatus according to claim 2, wherein the flicker detection unit detects a flicker occurrence in the first image or the second image based on a fluctuation of pixel values of the difference image in the vertical direction to the scanning direction of the first image and the second image.

6. The imaging apparatus according to claim 5, wherein the difference image is generated by calculating a difference in pixel values between each corresponding pixel for the first image and the second image.

7. A method to detect a flicker occurrence, said method comprising:
   executing capturing a first image by an imaging sensor adjusted to a first charge accumulation time, the first charge accumulation time not causing a flicker in an image captured by the imaging sensor under a light source blinking at a first blink cycle;
   executing capturing a second image by the imaging sensor adjusted to a second charge accumulation time, the second charge accumulation time being different from the first charge accumulation time and causing a flicker in a captured image under the light source blinking at the first blink cycle;
   detecting a flicker occurrence in the first image or the second image based on a difference in luminance between the first image and the second image;
   generating a difference image between the first image and the second image;
   synchronizing the second charge accumulation time with a second blink cycle of the light source, which does not cause a flicker in a captured image under the light source blinking at the second blink cycle; and
   detecting which of the first image and the second image a flicker is generated in according to at least one of both a fluctuation period and a fluctuation frequency of pixel values of the difference image in a vertical direction to a scanning direction of the first image and the second image.

8. The imaging apparatus according to claim 1, wherein the difference image has a vertical direction and a horizontal direction.

9. The imaging apparatus according to claim 8, wherein the flicker detection unit further comprises a flicker frequency detection unit for detecting a flicker frequency in the difference image.

10. The imaging apparatus according to claim 9, wherein the flicker frequency detection unit detects the flicker frequency in the vertical direction of the difference image.

11. The imaging apparatus according to claim 9, wherein the flicker frequency detection unit detects the flicker frequency in the vertical direction of the difference image using a digital matched filter.

12. The imaging apparatus according to claim 9, wherein the flicker frequency detection unit detects the flicker frequency of the difference image based on a spatial frequency spectrum of a Fourier transformed difference image.

13. The imaging apparatus according to claim 8, wherein the flicker detection unit computes average values of luminance in the vertical direction of the difference image and standard deviation values of luminance in the vertical direction of the difference image, and performs an evaluation of the computed average values of luminance in the vertical direction and the standard deviation of luminance in the vertical direction to determine if flicker has occurred.

14. The imaging apparatus according to claim 1, wherein the first charge accumulation time has a first period and the second charge accumulation time has a second period, and the first period is different from the second period.

15. The imaging apparatus according to claim 2, wherein the difference image generation unit is configured to generate a plurality of difference images between the plurality of first images and the plurality of second images, and
   wherein the plurality of difference images each have a vertical direction and a horizontal direction.

16. An imaging apparatus comprising;
   an imaging sensor;
   a control unit configured to control capturing a first image by the imaging sensor adjusted to a first charge accumulation time and capturing a second image by the imaging sensor adjusted to a second charge accumulation time, the first charge accumulation time not causing a flicker in an image captured by the imaging sensor under a light source blinking at a first blink cycle, the second charge accumulation time different from the first charge accumulation time and causing a flicker in a captured image under the light source blinking at the first blink cycle; and
   a flicker detection unit configured to detect a flicker occurrence in the first image or the second image based on a difference in luminance between the first image and the second image,
   wherein the first charge accumulation time has a first period and the second charge accumulation time has a second period, and the first period is different from the second period,
   wherein the first image comprises one of a plurality of first images including:
      an initial first image; and
      a subsequent first image,
   wherein the second image is one of a plurality of second images including:
      an initial second image; and
      a subsequent second image,
   wherein the first charge accumulation time has an initial first image charge accumulation time and a subsequent first image charge accumulation time,
      wherein the initial first image charge accumulation time for the initial first image of the plurality of first images is different from the subsequent first image charge accumulation time for the subsequent first image of the plurality of first images, and the second charge accumulation time has an initial second image charge accumulation time and a subsequent second image charge accumulation time, and
      wherein the initial second image charge accumulation time for the initial second image of the plurality of second images is different from the subsequent second image charge accumulation time for the subsequent second image of the plurality of second images.

17. The imaging apparatus according to claim 16, wherein the flicker detection unit will only detect flicker if the flicker detection unit has detected flicker in a plurality of the plurality of difference images.

* * * * *